(12) United States Patent
Swanson

(10) Patent No.: US 9,382,672 B2
(45) Date of Patent: Jul. 5, 2016

(54) APPARATUS AND METHOD FOR DRYER PERFORMANCE OPTIMIZATION SYSTEM

(71) Applicant: Astec, Inc., Chattanooga, TN (US)

(72) Inventor: Malcolm L. Swanson, Chickamauga, GA (US)

(73) Assignee: Astec, Inc., Chattanooga, TN (US)

( * ) Notice: Subject to any disclaimer, the term of this patent is extended or adjusted under 35 U.S.C. 154(b) by 123 days.

(21) Appl. No.: 14/478,828

(22) Filed: Sep. 5, 2014

(65) Prior Publication Data

US 2014/0373385 A1    Dec. 25, 2014

Related U.S. Application Data

(63) Continuation-in-part of application No. 13/373,946, filed on Dec. 6, 2011, now Pat. No. 8,863,404.

(60) Provisional application No. 61/459,049, filed on Dec. 6, 2010.

(51) Int. Cl.
| | |
|---|---|
| F26B 25/16 | (2006.01) |
| E01C 19/05 | (2006.01) |
| F26B 21/08 | (2006.01) |
| F26B 23/02 | (2006.01) |
| F26B 11/02 | (2006.01) |
| F26B 21/00 | (2006.01) |

(Continued)

(52) U.S. Cl.
CPC .............. *E01C 19/05* (2013.01); *F26B 11/022* (2013.01); *F26B 11/04* (2013.01); *F26B 11/0477* (2013.01); *F26B 21/003* (2013.01); *F26B 21/08* (2013.01); *F26B 21/10* (2013.01); *F26B 23/02* (2013.01); *F26B 25/005* (2013.01); *Y02P 70/40* (2015.11)

(58) Field of Classification Search
CPC ............ F26B 9/00; F26B 21/00; F26B 21/06; F26B 25/00; F26B 25/16; E01C 19/00; E01C 19/05
USPC .......... 34/474, 493, 551, 88; 110/104 B, 260, 110/263; 44/589, 635; 431/8, 254, 257; 366/7, 15, 23
See application file for complete search history.

(56) References Cited

U.S. PATENT DOCUMENTS

| | | |
|---|---|---|
| 4,279,207 A | 7/1981 | Wormser |
| 4,324,544 A | 4/1982 | Blake |

(Continued)

FOREIGN PATENT DOCUMENTS

| | | | |
|---|---|---|---|
| DK | WO 2010051816 A2 * | 5/2010 | ............. E01C 19/05 |
| EP | 927862 A1 | 7/1999 | |
| JP | 04202903 A | 7/1992 | |

*Primary Examiner* — Stephen M Gravini
(74) *Attorney, Agent, or Firm* — Chambliss, Bahner & Stophel, P.C.

(57) ABSTRACT

A dryer performance optimization system comprising a dryer having an inner wall and being adapted to rotate at variable speeds and a variable frequency drive being adapted to vary the rotational speed of the dryer. The preferred system also comprises a baghouse having an inlet end being adapted to receive exhaust gas from the dryer and an outlet end and a controller being adapted to control the temperature of the exhaust gas from the dryer. A method for controlling the temperature of exhaust gas in a baghouse comprising providing a dryer performance optimization system as described herein and varying the temperature of the exhaust gas from the dryer by varying the rotational speed of the dryer.

19 Claims, 5 Drawing Sheets

(51) Int. Cl.
*F26B 21/10* (2006.01)
*F26B 11/04* (2006.01)
*F26B 25/00* (2006.01)

(56) References Cited

U.S. PATENT DOCUMENTS

| | | | |
|---|---|---|---|
| 4,627,173 A | 12/1986 | O'Hagan et al. | |
| 5,046,265 A | 9/1991 | Kalb | |
| 5,067,254 A | 11/1991 | Linkletter et al. | |
| 5,203,693 A | 4/1993 | Swanson | |
| 5,207,176 A | 5/1993 | Morhard et al. | |
| 5,302,118 A | 4/1994 | Renegar et al. | |
| 5,305,533 A | 4/1994 | Alexander et al. | |
| 5,378,083 A | 1/1995 | Swanson | |
| 5,522,158 A | 6/1996 | Swanson | |
| 5,579,587 A | 12/1996 | Morrison et al. | |
| 5,596,935 A | 1/1997 | Swanson | |
| 6,164,809 A | 12/2000 | Hawkins | |
| 6,185,842 B1 | 2/2001 | Brashears | |
| 6,256,902 B1 | 7/2001 | Flaherty et al. | |
| 6,327,994 B1 * | 12/2001 | Labrador | B01D 61/10 114/382 |
| 7,044,630 B1 | 5/2006 | Hawkins | |
| 7,566,162 B1 | 7/2009 | Swanson | |
| 8,863,404 B1 * | 10/2014 | Swanson | F26B 11/022 110/263 |
| 2002/0179545 A1 | 12/2002 | Rosenberger et al. | |
| 2003/0200672 A1 | 10/2003 | Keller | |
| 2010/0011610 A1 | 1/2010 | Bittorf et al. | |
| 2011/0252660 A1 * | 10/2011 | Hansen | E01C 19/05 34/89 |
| 2012/0263007 A1 | 10/2012 | Swanson | |
| 2013/0067806 A1 | 3/2013 | Brock et al. | |
| 2013/0272936 A1 | 10/2013 | Nalepa et al. | |
| 2013/0288307 A1 | 10/2013 | Medoff | |
| 2013/0295624 A1 | 11/2013 | Medoff et al. | |
| 2014/0373385 A1 * | 12/2014 | Swanson | F26B 11/0477 34/474 |

* cited by examiner

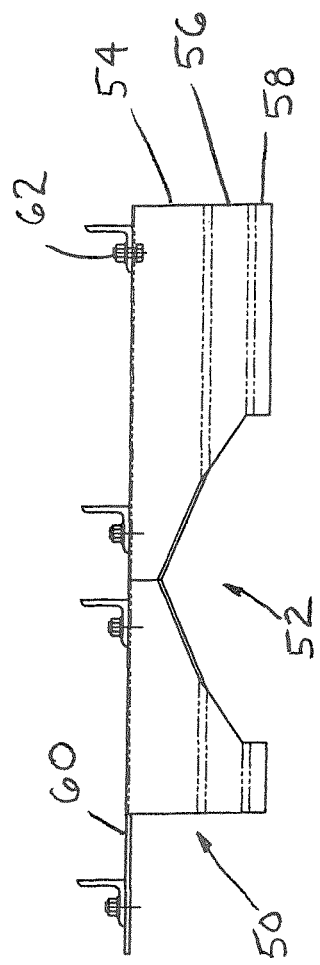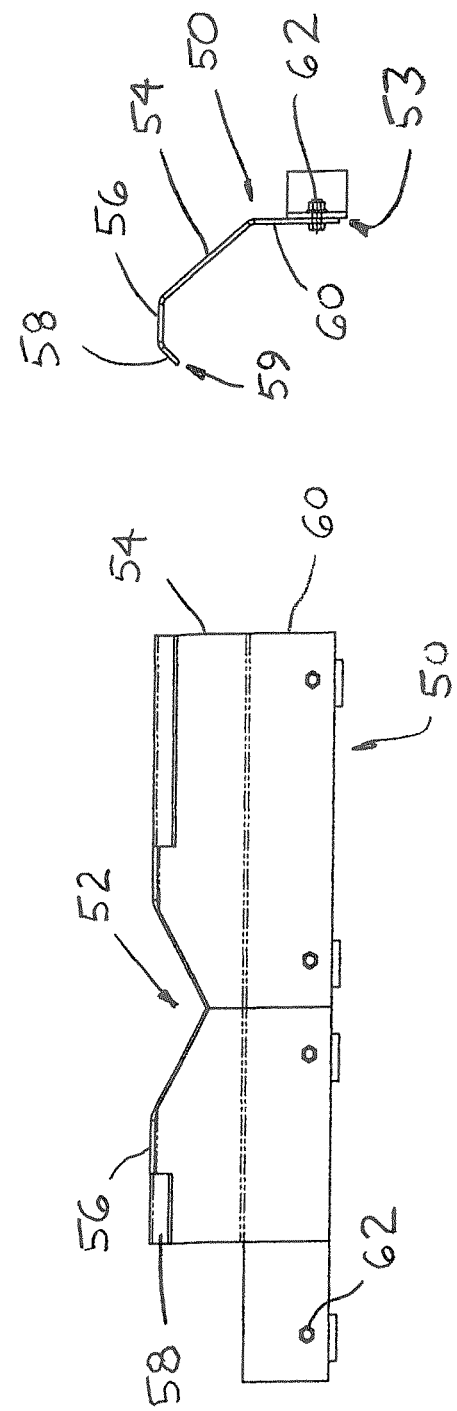

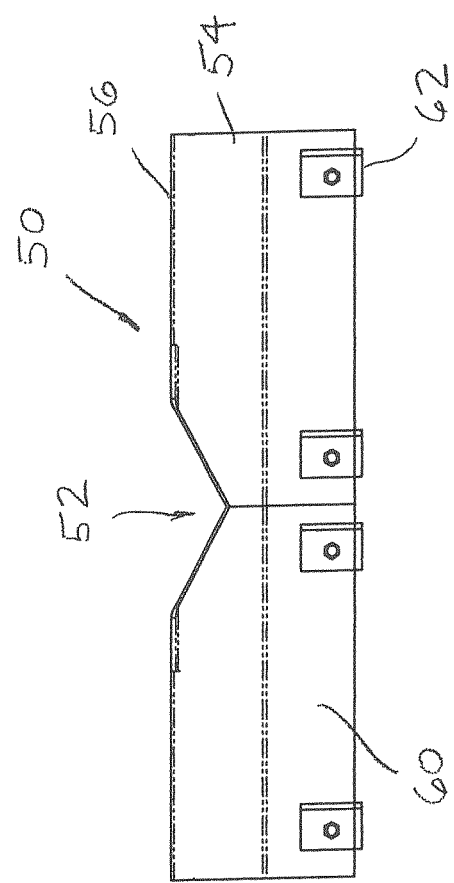

APPARATUS AND METHOD FOR DRYER PERFORMANCE OPTIMIZATION SYSTEM

CROSS-REFERENCES TO RELATED PATENTS/APPLICATIONS

This continuation-in-part application relates back to and claims the benefit of priority from U.S. patent application Ser. No. 13/373,946 entitled "Apparatus and Method for Dryer Performance Optimization System" and filed on Dec. 6, 2011, which relates back to and claims the benefit of priority from U.S. Provisional Application for Patent No. 61/459,049 titled "Apparatus and Method for Dryer Performance Optimization System" and filed on Dec. 6, 2010.

FIELD OF THE INVENTION

The present invention relates generally to dryer systems, and particularly to asphalt plant dryer performance optimization systems.

BACKGROUND AND DESCRIPTION OF THE PRIOR ART

It is known to use dryers for drying materials used in an asphalt plant adapted to produce hot mix asphalt. Conventional asphalt plant dryers, however, suffer from several disadvantages. For example, conventional asphalt plant dryer performance is limited by exhaust gas temperature. More particularly, if the dryer exhaust gas is excessively hot, then the bags in the baghouse will be damaged. If, on the other hand, the dryer exhaust gas is excessively cold, mud will accumulate in the feed end of a counter flow dryer, the exhaust ductwork and the baghouse. Conventional asphalt plant dryers are not adapted to automatically control the temperature of dryer exhaust gas. Further, conventional asphalt plant dryers must be shut down in order to adjust the temperature of the dryer exhaust gas. Still further, conventional asphalt plant dryers also do not maximize fuel efficiency.

It would be desirable, therefore, if an apparatus and method for a dryer system could be provided that would not be limited by exhaust gas temperature. It would also be desirable if such a dryer system could be provided that would be adapted to automatically control the temperature of dryer exhaust gas. It would be further desirable if such a dryer system could be provided that would allow for dryer exhaust gas temperature adjustment without shutting down the dryer. It would be still further desirable if such a dryer system could be provided that would maximize fuel efficiency.

ADVANTAGES OF THE PREFERRED EMBODIMENTS OF THE INVENTION

Accordingly, it is an advantage of the preferred embodiments of the invention described herein to provide an apparatus and method for a dryer system that is not limited by exhaust gas temperature. It is also an advantage of the preferred embodiments of the invention described herein to provide an apparatus and method for a dryer system that is adapted to automatically control the temperature of the dryer exhaust gas. It is a further advantage of the preferred embodiments of the invention described herein to provide an apparatus and method for a dryer system in which the dryer exhaust gas temperature may be adjusted without shutting down the dryer system. It is a still further advantage of the preferred embodiments of the invention described herein to provide an apparatus and method for a dryer system that maximizes fuel efficiency.

Additional advantages of the preferred embodiments of the invention will become apparent from an examination of the drawings and the ensuing description.

EXPLANATION OF TECHNICAL TERMS

As used herein, the term "controller" means any device, mechanism, assembly or combination thereof that is adapted to receive, interpret, execute and/or convey instructions, including without limitation, automatic controllers (such as programmable logic controllers and microprocessors) and non-automatic or manually-operated controllers.

SUMMARY OF THE INVENTION

The apparatus of the invention comprises a dryer performance optimization system. The preferred dryer performance optimization system comprises a dryer having an inner wall and being adapted to rotate at variable speeds and a variable frequency drive being adapted to vary the rotational speed of the dryer. The preferred dryer performance optimization system also comprises a baghouse having an inlet end being adapted to receive exhaust gas from the dryer and an outlet end and a controller being adapted to control the temperature of the exhaust gas from the dryer.

The method of the invention comprises a method for controlling the temperature of exhaust gas in a baghouse. The preferred method comprises providing a dryer performance optimization system. The preferred system comprises a dryer having an inner wall and being adapted to rotate at variable speeds and a variable frequency drive being adapted to vary the rotational speed of the dryer. The preferred system also comprises a baghouse having an inlet end being adapted to receive exhaust gas from the dryer and an outlet end and a controller being adapted to control the temperature of the exhaust gas from the baghouse. The preferred method also comprises varying the temperature of the exhaust gas from the dryer by varying the rotational speed of the dryer.

BRIEF DESCRIPTION OF THE DRAWING

The presently preferred embodiment of the invention is illustrated in the accompanying drawing, in which like reference numerals represent like parts throughout, and in which:

FIG. 3 is a front view of a first alternative embodiment of the V flight in accordance with the present invention.

FIG. 3A is a right side view of the preferred V flight illustrated in FIG. 3.

FIG. 3B is a top view of the preferred V flight illustrated in FIGS. 3-3A.

FIG. 3C is a back view of the preferred V flight illustrated in FIGS. 3-3B.

DESCRIPTION OF THE PREFERRED EMBODIMENTS OF THE INVENTION

Figure 1:
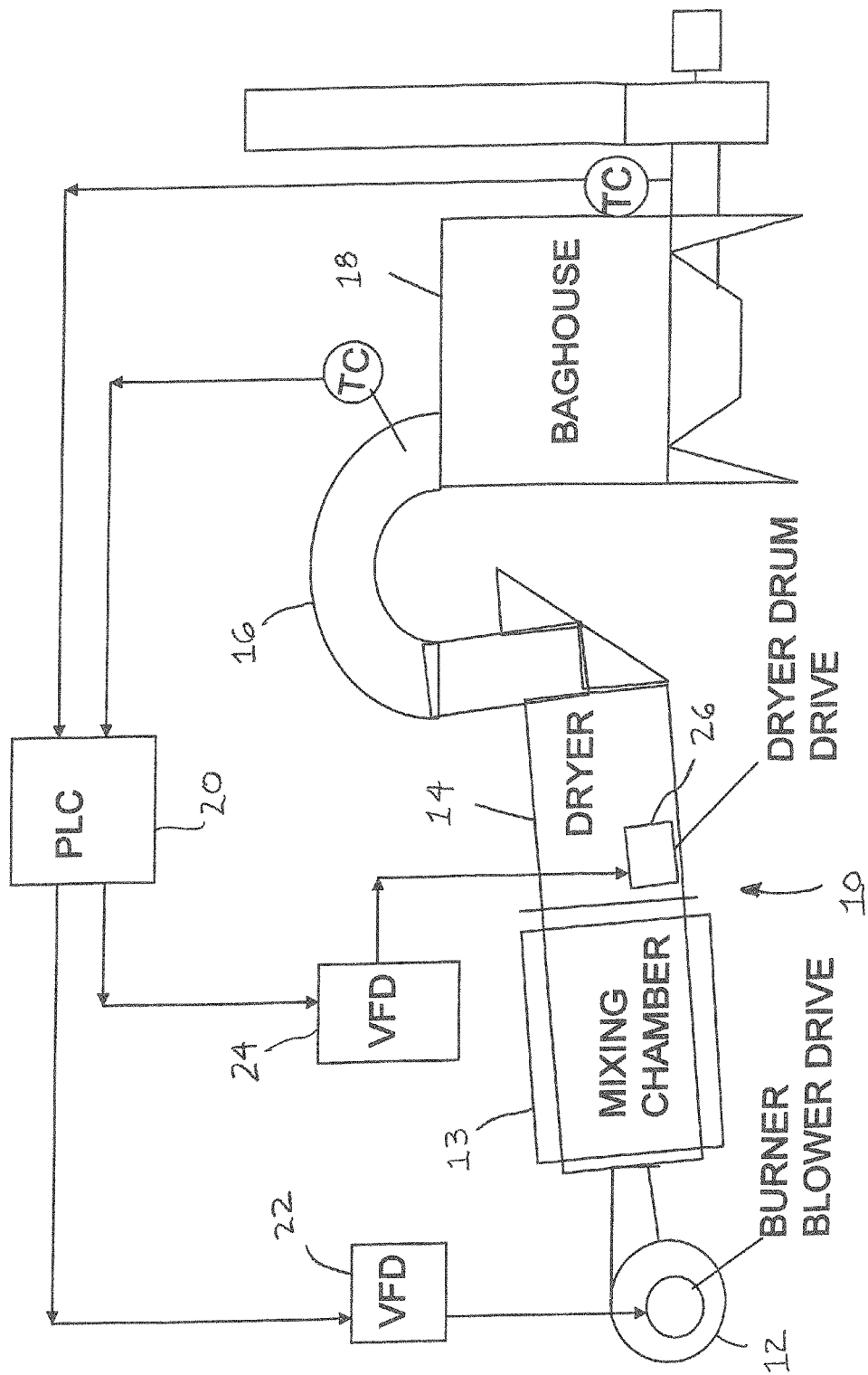
FIG. 1 is a schematic view of an exemplary hot mix asphalt plant including the preferred dryer performance optimization system in accordance with the present invention.

Referring now to the drawings, a schematic view of an exemplary hot mix asphalt plant including the preferred dryer performance optimization system in accordance with the present invention is illustrated by FIG. 1. As shown in FIG. 1, the preferred exemplary asphalt plant is designated generally by reference numeral 10. The preferred asphalt plant 10 includes burner 12, mixing chamber 13, dryer 14, duct 16, baghouse 18 and controller 20. The preferred burner 12 and the preferred dryer 14 are controlled by controller 20 through variable frequency drives 22 and 24, respectively. The preferred burner 12 has a variable firing rate and a variable amount of excess air. The preferred dryer 14 has an inner wall and is adapted to rotate at variable speeds. Further, the preferred dryer 14 includes dryer drum drive 26. The preferred duct 16 is adapted to convey exhaust gas from dryer 14 to baghouse 18. The preferred baghouse has an inlet end which is adapted to receive exhaust gas from dryer 14 and an outlet end.

Still referring to FIG. 1, the preferred controller 20 is adapted to control the temperature of exhaust gas from the dryer. More particularly, preferred controller 20 is adapted to control variable frequency drives 22 and 24. The preferred variable frequency drive 22 is adapted to vary the amount of excess air in burner 12 and the firing rate of the burner. The preferred variable frequency drive 24 is adapted to vary the rotational speed of dryer 14. More particularly, preferred variable frequency drive 24 is adapted to vary the speed of dryer drum drive 26. In the preferred asphalt plant 10, the temperature of dryer exhaust gas is determined and monitored by controller 20 at the inlet end and the outlet end of baghouse 18. Preferably, the baghouse inlet end temperature is used for primary temperature control and the baghouse outlet end temperature is used for emergency shutdown. Also in the preferred asphalt plant 10, dryer exhaust gas temperature information is communicated to controller 20.

Still referring to FIG. 1, the preferred dryer 14 includes a flighted drum in which the exhaust gas temperature changes approximately inversely to the rotational speed of the dryer drum. In the preferred asphalt plant 10, preferred controller 20 is adapted to control the variable frequency drive 24 in order to control the rotational speed of the preferred drum of dryer 14. The temperature in baghouse 18 can be varied by approximately 100° F. by increasing and decreasing the rotational speed of the drum of dryer 14. More particularly, in the preferred embodiment of the dryer optimization system, the rotational speed of the drum of dryer 14 has a base speed of approximately 8 rotations per minute. When the exhaust gas temperature falls below a set point with the drum speed at the base speed, preferred controller 20 reduces the drum speed to increase the exhaust gas temperature. In the preferred embodiment of the dryer optimization system, the minimum allowable speed is approximately 6 rotations per minute. When the exhaust gas temperature rises above a set point with the drum speed at the base speed, preferred controller 20 increases the drum speed to decrease the exhaust gas temperature. In the preferred embodiment of the dryer optimization system, the maximum allowable speed is approximately 12 rotations per minute.

Still referring to FIG. 1, the preferred controller 20 is also adapted to control variable frequency drive 22 in order to control the amount of excess air in preferred burner 12. More particularly, in the event that the exhaust gas temperature cannot be sufficiently increased or decreased by altering the rotational speed of the dryer drum, then controller 20 varies the amount of excess air in burner 12. In the preferred asphalt plant 10, an increase in the amount of excess air in the burner increases the temperature of dryer exhaust gas, and a decrease in the amount of excess air in the burner decreases the temperature of dryer exhaust gas. More particularly, in the preferred dryer performance optimization system, the amount of excess air in burner 12 may be increased or decreased from an excess air baseline by approximately 10%. Preferably, the amount of excess air being used will be determined on a mass flow basis by continuous measurement of the fuel and air flows. Also in the preferred asphalt plant 10, dryer exhaust gas can be varied by approximately 15° F. by changing the amount of excess air in the burner.

As a consequence of the changed heat demand caused by the variation of the amount of burner excess air and the variation of the rotational speed of the dryer drum, the firing rate of the burner varies. In the preferred asphalt plant 10, the temperature of dryer exhaust gas can be varied by approximately 5° F. to 10° F. as a result of the changed firing rate of the burner. The preferred dryer performance optimization system, therefore, is adapted to increase or decrease the temperature of baghouse gas exhaust by approximately 120° F. to 125° F.

Figures 2, 2A:
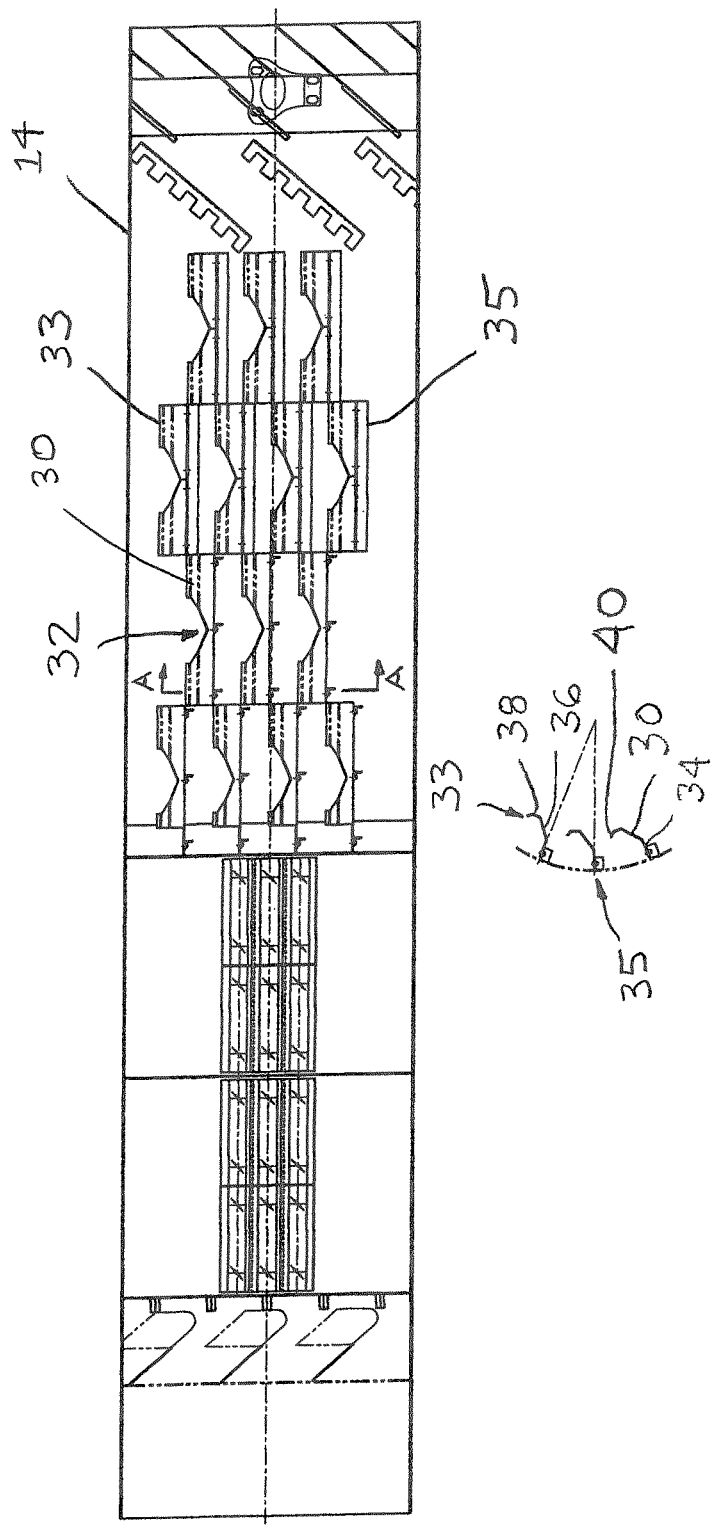
FIG. 2 is a partial sectional front view of the preferred dryer drum of the dryer performance optimization system in accordance with the present invention.
FIG. 2A is a sectional left side view of the preferred dryer drum illustrated in FIG. 2 and taken along line A-A.

Referring now to FIG. 2, a partial sectional front view of the preferred drum of dryer 14 of the dryer performance optimization system in accordance with the present invention is illustrated. As shown in FIG. 2, preferred dryer 14 comprises a plurality of flights on the inner wall of the dryer. More particularly, FIG. 2 illustrates an exemplary arrangement of V flights 30 on the inner wall of the drum of dryer 14. As shown in FIG. 2, the preferred V flights 30 are arranged substantially parallel to each other on the inner wall of the drum of dryer 14. Each of the preferred V flights 30 includes a V-shaped notch 32 located in the central portion of distal 33 end of the flight and extends toward the proximal end 35. The unique shape of preferred V flights 30 enables them to provide a wider stream and a more uniform veil of virgin aggregate across the entire width of the drum without regard to the amount of material in the drum, the plant production rate or the RAP percentage, thereby minimizing or eliminating hot gas bypassing in the dryer drum. The unique shape of preferred V flights also enables the system to run a variety of mixes of materials ranging from virgin WMA to high RAP and open grade mixes without flight changes. Varying the rotational speed of the drum of preferred dryer 14 produces corresponding changes in aggregate veil density. Faster rotation produces a more dense veil and increased heat transfer efficiency due to the increased available heat transfer surface in the veil. The increased heat transfer efficiency reduces the temperature of baghouse exhaust gas (inlet). Slower rotation reduces the veil in the air and causes reduced heater transfer efficiency and an increase in baghouse exhaust gas temperature. The drum speed changes are accomplished using variable frequency drives 22 and 24. While FIG. 2 illustrates a preferred arrangement of the V flights on the inner wall of the dryer drum, it is contemplated within the scope of the invention that the V flights may be arranged in any suitable manner.

Referring now to FIG. 2A, a sectional left side view of the preferred dryer drum taken along line A-A of FIG. 2 is illustrated. As shown in FIG. 2A, each preferred V flight 30 comprises a first extending portion 34 which is adjacent to its proximal end 35, a second extending portion 36 which is adjacent to the first extending portion, a third extending portion 38 which is adjacent to the second extending portion and a fourth extending portion 40 which is adjacent to the third extending portion and extends to distal end 33. While FIG. 2A illustrates the preferred configuration of the V flights, it is contemplated within the scope of the invention that the V flights may be of any suitable configuration.

Referring now to FIG. 3, a front view of a first alternative embodiment of the V flight in accordance with the present invention is illustrated. As shown in FIG. 3, each of the preferred V flights 50 comprises V-shaped notch 52, first extending portion 54, second extending portion 56 and third extending portion 58. Each of the preferred V flights 50 also comprises a mounting portion 60 which is disposed adjacent to the inner wall of the drum of dryer 14. Preferably, V flights 50 are mounted to the inner wall with a threaded fastener such as nut and bolt combination 62, but it is contemplated within the scope of the invention that the flights may be removably attached to the inner wall of the dryer drum by any suitable means, device, mechanism, assembly or combination thereof. It is also contemplated that the flights may be fixedly attached to the inner wall of the dryer drum.

Referring now to FIG. 3A, a right side view of preferred V flight 50 is illustrated. As shown in FIG. 3A, preferred V flight 50 comprises proximal end 53, first extending portion 54, second extending portion 56, third extending portion 58, distal end 59, mounting portion 60 and nut and bolt combination 62.

Referring now to FIG. 3B, a top view of preferred V flight 50 is illustrated. As shown in FIG. 3B, the preferred V flight 50 comprises V-shaped notch 52, first extending portion 54, second extending portion 56, third extending portion 58, mounting portion 60 and nut and bolt combination 52.

Referring now to FIG. 3C, a back view of preferred V flight 50 is illustrated. As shown in FIG. 3C, the preferred V flight 50 comprises V-shaped notch 52, first extending portion 54, second extending portion 56, mounting portion 60 and nut and bolt combination 62.

Figure 4:
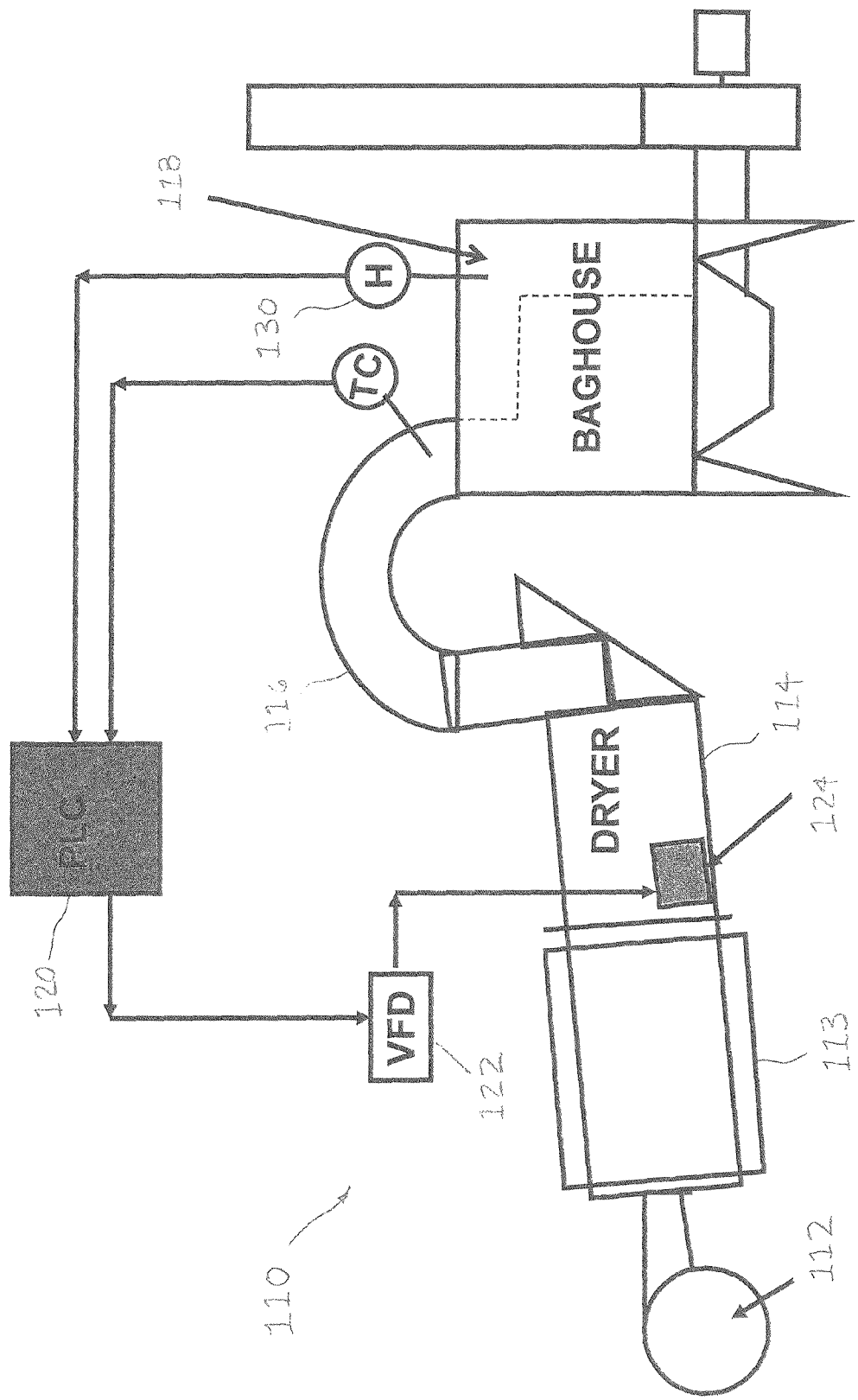
FIG. 4 is a schematic view of a first alternative embodiment of an exemplary hot mix asphalt plant including the preferred dryer performance optimization system in accordance with the present invention.

Referring now to FIG. 4, a schematic view of a first alternative embodiment of an exemplary hot mix asphalt plant including the preferred dryer performance optimization system in accordance with the present invention is illustrated. As shown in FIG. 4, the preferred exemplary asphalt plant is designated generally by reference numeral 110. The preferred asphalt plant 110 includes burner 112, mixing chamber 113, dryer 114, duct 116, baghouse 118 and controller 120. The preferred dryer 114 is controlled by controller 120 through variable frequency drive 122 and dryer drum drive 124. The preferred burner 112 has a variable firing rate and a variable amount of excess air. The preferred dryer 114 has an inner wall and is adapted to rotate at variable speeds. The preferred duct 116 is adapted to convey exhaust gas from dryer 114 to baghouse 118. The preferred baghouse has an inlet end which is adapted to receive exhaust gas from dryer 114 and an outlet end.

Still referring to FIG. 4, the preferred controller 120 is adapted to control the temperature of exhaust gas from the dryer. More particularly, preferred controller 120 is adapted to control variable frequency drive 122 and dryer drum drive 124. The preferred variable frequency drive 122 and preferred dryer drum drive 124 are adapted to vary the rotational speed of dryer 114. In the preferred asphalt plant 110, the temperature of dryer exhaust gas is determined by temperature sensors at the inlet end and the outlet end of baghouse 118 and monitored and controlled by controller 120. Preferably, the baghouse inlet end temperature is used for primary temperature control and the baghouse outlet end temperature is used for emergency shutdown. Also in the preferred asphalt plant 110, dryer exhaust gas temperature information is communicated to controller 120.

Still referring to FIG. 4, preferred asphalt plant 110 further comprises humidity sensor 130 which is adapted to determine a humidity level in baghouse 118. Preferred humidity sensor 130 is disposed in the clean air plenum of baghouse 118, but it is contemplated within the scope of the invention that the humidity sensor may be disposed in any suitable location for determining the humidity level in the baghouse. Preferably, humidity sensor 130 communicates the humidity level to controller 120 which monitors and controls the humidity level in baghouse 118. More particularly, in preferred asphalt plant 110, relative humidity or humidity ratio in baghouse 118 is determined, monitored, and controlled for the purpose of controlling the temperature in the baghouse. Preferably, the humidity level in baghouse 118 is controlled by varying the rotational speed of dryer 114, however, it is contemplated within the scope of the invention that the humidity level in the baghouse may be controlled by any suitable means. It is also contemplated within the scope of the invention that the level of humidity in baghouse 118 may be used in place of or in addition to the temperature in the baghouse as the process variable for controlling the asphalt production process. It is further contemplated within the scope of the invention that a temperature sensor may be used to avoid excessive temperatures and moisture condensation which results in mud accumulation, blinding of bags, and corrosion of the steel plate and cages in baghouse 118, and a humidity sensor may be used to prevent condensation. Preferably, baghouse 118 is insulated such that the temperature of the steel plate is substantially the same as the temperature of the exhaust gas in the baghouse so that condensation will not collect on the walls of the steel plate before it occurs throughout the baghouse.

Still referring to FIG. 4, it is also contemplated within the scope of the invention that in the preferred dryer performance optimization system a maximum humidity level and a minimum temperature in baghouse 118 may be set. Alternatively, the humidity level in baghouse 118 may be used as data that controller 120 uses to calculate a dew point temperature and a target baghouse operating temperature. Controlling the humidity level in baghouse 118 results in improved process efficiency, reduced fuel expenses, and reduced combustion emissions by capturing heat that is typically lost with asphalt plant stack gases in conventional plants. In addition, the preferred dryer performance optimization system permits a broader range of asphalt mixes to be produced at an asphalt plant and improves production rates.

The invention also comprises a method for controlling the temperature of exhaust gas from the dryer. The preferred method comprises providing a dryer performance optimization system as described herein. The preferred method further comprises varying the temperature of the exhaust gas from the dryer by varying the rotational speed of the dryer, varying the amount of excess air in the burner and/or varying the firing rate of the burner. The preferred method also comprises a dryer performance optimization system that includes a variable frequency drive and a plurality of flights on the inner wall of the dryer at least one of which is a V flight. In the preferred method, dryer exhaust gas temperature is monitored at the inlet and outlet of the baghouse. Preferably, the exhaust gas temperature at the inlet of the baghouse is the primary temperature monitored for purposes of controlling exhaust gas temperature, and the exhaust gas temperature at the outlet of the baghouse is the primary temperature monitored for purposes of an emergency shut down. It is contemplated within the scope of the invention, however, that exhaust gas temperature may be monitored at any suitable location and for any suitable purpose.

In addition, the preferred method for controlling the temperature of exhaust gas from a dryer comprises providing a dryer performance optimization system that includes a humidity sensor that is adapted to determine a humidity level in the baghouse. In the preferred embodiments of the method for controlling the temperature of exhaust gas from a dryer, the controller is adapted to vary the humidity level in the baghouse. Preferably, the controller varies the humidity level in the baghouse by varying the rotational speed of the dryer drum. More particularly, in the preferred embodiments of the method for controlling the temperature of exhaust gas from a dryer, when the relative humidity level rises above a predetermined set-point, the controller decreases the rotational speed of the dryer drum so as to increase the temperature of the exhaust gas in the baghouse and reduce the relative humidity level. Similarly, when the relative humidity level decreases below a predetermined set-point, the controller increases the rotational speed of the dryer drum so as to decrease the temperature of the exhaust gas in the baghouse and increase the relative humidity level. It is also contemplated within the scope of the invention that the humidity level in the baghouse may be varied by varying the firing rate of and/or the amount of excess gas in the burner.

In the preferred system, when the dryer exhaust temperature is below the desired temperature, e.g. 250° F., the controller causes the dryer drum to decrease its rotational speed in order to increase the exhaust gas temperature. If the decrease in rotational speed of the dryer drum does not increase the exhaust gas temperature to the desired temperature, then the controller causes the amount of excess air in the burner to be increased. In the alternative, injection air may be introduced to the system apart from the burner so as not to impact combustion in the burner and so as to increase the exhaust gas temperature. Preferably, the injection air is introduced into the system via a ring manifold around the burner and a plurality of injection nozzles so as not to impact combustion in the burner. It is contemplated within the scope of the invention, however, that the injection air may be introduced into the system via any suitable device, mechanism, assembly or combination thereof at any suitable location in the system. The increased heat demand resulting from the decreased rotational speed of the dryer drum and the increased amount of burner excess air and/or injection air causes the burner firing rate to increase, thereby further increasing the temperature of the dryer exhaust gas. While the foregoing describes the preferred method for increasing dryer exhaust gas temperature, it is contemplated within the scope of the invention that the preferred steps may be performed in a different sequence and/or that two or more of the preferred steps may be performed simultaneously.

Also in the preferred system, when the dryer exhaust gas temperature is above the desired temperature, the controller causes the dryer drum to increase its rotational speed in order to reduce the exhaust gas temperature. If the increase in rotational speed of the dryer drum does not reduce the exhaust gas temperature to the desired temperature, then the controller causes the amount of excess air in the burner to be reduced. In the alternative, the controller causes the amount of injection air introduced into the system to be reduced. The reduced heat demand resulting from the increased rotational speed of the dryer drum and the reduced amount of burner excess air and/or injection air causes the burner firing rate to decrease, thereby further reducing the temperature of the dryer exhaust gas. While the foregoing describes the preferred method for reducing dryer exhaust gas temperature, it is contemplated within the scope of the invention that the preferred steps may be performed in a different sequence and/or that two or more of the preferred steps may be performed simultaneously.

In operation, several advantages of the preferred embodiments of the invention are achieved. For example, the preferred embodiments of the invention provide an apparatus and method for a dryer system that is not limited by exhaust gas temperature. The preferred embodiments of the invention described herein also provide an apparatus and method for a dryer system that is adapted to automatically control the temperature of the dryer exhaust gas. The preferred embodiments of the invention described herein further provide an apparatus and method for a dryer system in which the dryer exhaust gas temperature may be adjusted without shutting down the dryer. The preferred embodiments of the invention described herein still further provide an apparatus and method for a dryer system that maximizes fuel efficiency.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A dryer performance optimization system, said system comprising:
   (a) a dryer, said dryer having a drum with a plurality of flights on an inner wall, said drum being adapted to rotate at variable speeds;
   (b) a variable frequency drive, said variable frequency drive being adapted to vary the rotational speed of the dryer drum;
   (c) a baghouse, said baghouse having an inlet end being adapted to receive exhaust gas from the dryer and an outlet end;
   (d) a controller, said controller being adapted to control the temperature of the exhaust gas from the dryer; and
   (e) a humidity sensor, said humidity sensor being adapted to determine a humidity level in the baghouse.

2. The dryer performance optimization system of claim 1 further comprising a burner, said burner having a variable firing rate and a variable amount of excess air.

3. The dryer performance optimization system of claim 1 wherein the controller is adapted to control the variable frequency drive.

4. The dryer performance optimization system of claim 1 wherein the variable frequency drive is adapted to vary the firing rate of the burner.

5. The dryer performance optimization system of claim 1 wherein the variable frequency drive is adapted to vary the amount of excess air in the burner.

6. The dryer performance optimization system of claim 1 wherein the variable frequency drive is adapted to vary the rotational speed of the dryer drum.

7. The dryer performance optimization system of claim 1 wherein the variable frequency drive is adapted to vary the speed of a dryer drum drive.

8. The dryer performance optimization system of claim 1 wherein the controller is adapted to determine the temperature of exhaust gas at the inlet end of the baghouse.

9. The dryer performance optimization system of claim 1 wherein the controller is adapted to determine the temperature of exhaust gas at the outlet end of the baghouse.

10. The dryer performance optimization system of claim 1 further comprising a mixing chamber.

11. The dryer performance optimization system of claim 1 further comprising a duct adapted to convey exhaust gas from the dryer to the baghouse.

12. The dryer performance optimization system of claim 1 wherein at least one of the plurality of flights on the inner wall of the dryer drum has a V-shaped notch.

13. The dryer performance optimization system of claim 12 wherein the V-shaped notch extends from the distal end of the flight toward the proximal end of the flight.

14. A dryer performance optimization system, said system comprising:
   (a) a burner, said burner having a variable firing rate and a variable amount of excess air;
   (b) a dryer, said dryer having a plurality of flights on an inner wall and being adapted to rotate at variable speeds;
   (c) a variable frequency drive, said variable frequency drive being adapted to vary the rotational speed of the dryer, the amount of excess air in the burner and the firing rate of the burner;
   (d) a baghouse, said baghouse having an inlet end being adapted to receive exhaust gas from the dryer and an outlet end;
   (e) a controller, said controller being adapted to control the temperature of the exhaust gas from the dryer; and
   (f) a humidity sensor, said humidity sensor being adapted to determine a humidity level in the baghouse;
   wherein the controller is adapted to vary the humidity level in the baghouse.

15. A method for controlling the temperature of exhaust gas from a dryer, said method comprising:
   (a) providing a dryer performance optimization system, said system comprising:
      (1) a dryer, said dryer having a drum with a plurality of flights on an inner wall, said drum being adapted to rotate at variable speeds;
      (2) a variable frequency drive, said variable frequency drive being adapted to vary the rotational speed of the dryer drum;
      (3) a baghouse, said baghouse having an inlet end being adapted to receive exhaust gas from the dryer and an outlet end; and
      (4) a controller, said controller being adapted to control the temperature of the exhaust gas from the dryer; and
      (5) a humidity sensor, said humidity sensor being adapted to determine a humidity level in the baghouse; and
   (b) varying the humidity level in the baghouse by varying the rotational speed of the dryer drum.

16. The method of claim 15 further comprising:
   (c) varying the humidity level in the baghouse by varying the temperature of the exhaust gas in the baghouse.

17. The method of claim 15 wherein the system further comprises a burner.

18. The method of claim 17 further comprising:
   (c) varying the humidity level in the baghouse by varying the amount of excess air in the burner.

19. The method of claim 17 further comprising:
   (c) varying the humidity level in the baghouse by varying the firing rate of the burner.

* * * * *